Patented Mar. 23, 1948

2,438,400

UNITED STATES PATENT OFFICE 2,438,400

PREPARATION OF CYCLOPENTADIENE

Stanford J. Hetzel, Cheltenham, and Robert M. Kennedy, Drexel Hill, Pa., assignors to Sun Oil Company, Philadelphia, Pa., a corporation of New Jersey No Drawing. Application November 24, 1945, Serial No. 630,692

5 Claims. (Cl. 260—666)

This invention relates to cyclization. Specifically it relates to the dehydrogenation and cyclization of dehydrogenatable hydrocarbons, having 5 carbon atoms per molecule, especially 1,3 pentadiene. More specifically the invention is concerned with a commercially feasible process for the conversion of pentane or 1,3 pentadiene to 1,3 cyclopentadiene.

As stated, the invention is applicable to the dehydrogenation and cyclization of pentane to 1,3 cyclopentadiene. This conversion is considered to take place by way of 1-pentene and 1,3 pentadiene. Accordingly, the invention will be described with reference to the conversion of 1,3 pentadiene to 1,3 cyclopentadiene to which it is pre-eminently suited. These reactions can be represented as follows:

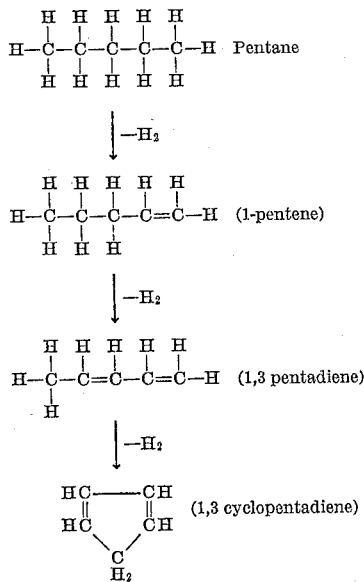

According to the invention, 1,3 pentadiene in pure form, or admixed with normal pentane and/or normal pentenes, or other gases, is contacted with a mass consisting essentially of chromic oxide ($Cr_2O_3$) on alumina at an elevated temperature for a time sufficient to effect a desired extent of conversion to 1,3 cyclopentadiene.

The temperature employed for the dehydrogenation of the hydrocarbons, in the instant case 1,3 pentadiene, will vary depending upon the other conditions of operation and on the nature or purity of the charging stock. However, the conversion of 1,3 pentadiene can be advantageously effected at a temperature within the range 300° C. to a temperature at which substantial decomposition of the hydrocarbons will take place. More specifically a temperature within the range 400° C.–700° C., preferably 450° C.–650° C., can be employed.

While the conversion per pass is substantially independent of pressure, it has been found that lower pressures seem to form higher yields on recycling. Accordingly, while higher and lower pressures are not excluded from the scope of the invention pressures in the range of 100 mm. Hg–10 mm. Hg, preferably 200 mm. Hg–10 mm. Hg, can be employed.

The time of contact of the 1,3 pentadiene with the chromic oxide on alumina is a factor to be considered. There is an optimum range of contact time corresponding to charging rates of 0.25 gram/minute/100 grams–10 grams/minute/100 grams of chromic oxide on alumina. However, higher and lower charging rates are not excluded from the scope of the invention.

*Example*

350 grams of 1,3 pentadiene were charged at a rate of 10 grams/minute at a pressure of about 760 mm. Hg to 1000 grams of a mass, consisting of chromic ($Cr_2O_3$) on alumina, in a conversion tube at a temperature of 600° C. The effluent from the conversion tube was cooled, condensed and fractionated resulting in a yield of 9.8 grams of 1,3 cyclopentadiene. On recycle of the unconverted 1,3 pentadiene the yield is 33 grams.

The contact mass employed was prepared by wetting alumina with chromium nitrate, by immersing it therein. The alumina was then removed, dried and ignited. Compositions containing from about 5% to about 35% $Cr_2O_3$, by weight of the contact mass, preferably about 20%, can be employed. Compositions without this range are not excluded from the scope of the invention, although these are not now preferred.

The alumina employed was that commonly used in catalytic work; that is, it was in an activated state. Alumina in activated state can be prepared in several different manners all of which are well known in the art.

The contact mass can be regenerated indefinitely to substantially its original activity.

The particle or pellet size can be varied. About 4 to 8 mesh has been found quite satisfactory. Obviously the particle size should not be too small in the sense that a large pressure drop across the contact mass is to be avoided if substantially the same pressure in all parts of the apparatus is desired, unless fluid or fluidized operation is employed.

It will be apparent to those versed in the art that wide modification and variation are possible within the scope of the invention as defined in the appended claims, the essence of the invention being in that dehydrogenatable hydrocarbons having 5 carbon atoms per molecule can be dehydrogenated and cyclized by contacting the same at elevated temperature and suitable pressure with a mass consisting essentially of chromic oxide on alumina as set forth herein and in the appended claims.

We claim:

1. A process for the dehydrogenation and cyclization of 1,3 pentadiene to 1,3 cyclopentadiene which comprises contacting 1,3 pentadiene with a mass consisting essentially of chromic oxide on alumina at a temperature of at least about 300° C. but not substantially above a temperature at which substantial decomposition of hydrocarbons present will take place for a time sufficient to effect a desired extent of conversion.

2. A process for the dehydrogenation and cyclization of 1,3 pentadiene to 1,3 cyclopentadiene which comprises contacting 1,3 pentadiene with a mass consisting essentially of chromic oxide on alumina at a temperature within the range 400° C.–700° C. for a time sufficient to effect a desired extent of conversion.

3. A process according to claim 2 wherein the pressure is in the range 1000 mm. Hg–10 mm. Hg.

4. A process for the dehydrogenation and cyclization of 1,3 pentadiene to 1,3 cyclopentadiene which comprises contacting 1,3 pentadiene with a mass consisting essentially of chromic oxide on alumina at a temperature within the range 450° C.–650° C. at a pressure within the range 200 mm. Hg–10 mm. Hg for a time sufficient to effect a desired extent of conversion.

5. A process according to claim 4 wherein the charging rate of 1,3 pentadiene to the contact mass is within the range 0.25–10 grams/minute/100 grams of the contact mass and wherein the contact mass consists of about 5% to about 35% of chromic oxide by weight.

STANFORD J. HETZEL.
ROBERT M. KENNEDY.

REFERENCES CITED

The following references are of record in the file of this patent:

UNITED STATES PATENTS

| Number | Name | Date |
|---|---|---|
| 2,273,338 | Thomas | Feb. 7, 1942 |
| 2,307,240 | Ruthruff | Jan. 5, 1943 |
| 2,376,059 | Jones | May 15, 1945 |
| 2,393,537 | Huffman | Jan. 22, 1946 |
| 2,399,678 | Houdry et al. | May 7, 1946 |
| 2,401,802 | Taylor et al. | June 11, 1946 |